US010752226B2

(12) United States Patent
Petzold et al.

(10) Patent No.: US 10,752,226 B2
(45) Date of Patent: Aug. 25, 2020

(54) BRAKE DEVICE FOR A HYDRAULIC MOTOR VEHICLE BRAKE SYSTEM

(71) Applicant: Continental Teves AG & Co. oHG, Frankfurt (DE)

(72) Inventors: Falk Petzold, Frankfurt/M (DE); Adrian Messner, Darmstadt (DE); Manfred Rüffer, Sulzbach (DE); Michael Jürging, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 84 days.

(21) Appl. No.: 15/774,171

(22) PCT Filed: Nov. 18, 2016

(86) PCT No.: PCT/EP2016/078115
§ 371 (c)(1),
(2) Date: May 7, 2018

(87) PCT Pub. No.: WO2017/089233
PCT Pub. Date: Jun. 1, 2017

(65) Prior Publication Data
US 2018/0326958 A1    Nov. 15, 2018

(30) Foreign Application Priority Data

Nov. 23, 2015 (DE) .................. 10 2015 223 047

(51) Int. Cl.
*B60T 13/14* (2006.01)
*B60T 7/04* (2006.01)
*B60T 13/68* (2006.01)

(52) U.S. Cl.
CPC ............. *B60T 13/143* (2013.01); *B60T 7/042* (2013.01); *B60T 13/686* (2013.01)

(58) Field of Classification Search
CPC ....... B60T 13/143; B60T 13/686; B60T 7/042
(Continued)

(56) References Cited

U.S. PATENT DOCUMENTS

| 4,736,588 A | 4/1988 | Leiber |
| 4,843,819 A | 7/1989 | Leiber |

(Continued)

FOREIGN PATENT DOCUMENTS

| DE | 19731962 A1 | 2/1999 |
| DE | 102006040424 A1 | 3/2008 |

(Continued)

OTHER PUBLICATIONS

Korean Office Action for Korean Application 10-2018-7014284, dated Dec. 20, 2018, with translation, 16 pages.

(Continued)

*Primary Examiner* — Xuan Lan Nguyen
(74) *Attorney, Agent, or Firm* — RatnerPrestia (57) ABSTRACT

A brake device having a hydraulic booster stage for a hydraulic motor vehicle brake system is provided, which brake device, within normal boosting operation, can be operated both in an autonomous, driver-independent actuation mode with electronic control and in a manual actuation mode controlled by the driver, and outside normal boosting operation, can be operated in an emergency mode with a non-boosted actuation force generated by the driver alone, in the case of which brake device it is proposed that, within normal boosting operation, each actuation mode is assigned a dedicated piston in a booster housing of the booster stage, which piston is acted on directly with the boosting force and transmits this mechanically to components connected functionally downstream.

16 Claims, 5 Drawing Sheets

(58) Field of Classification Search
USPC .................................... 303/114.1; 188/358
See application file for complete search history.

(56) References Cited

U.S. PATENT DOCUMENTS

| | | | |
|---|---|---|---|
| 5,012,647 A * | 5/1991 | Maggioni | B60T 13/144 |
| | | | 60/413 |
| 5,120,115 A * | 6/1992 | Schmitt | B60T 8/4004 |
| | | | 303/113.2 |
| 6,226,993 B1 | 5/2001 | Heibel | |
| 8,342,615 B2 | 1/2013 | Drumm | |
| 8,534,773 B2 * | 9/2013 | Honda | B60T 8/4275 |
| | | | 303/114.1 |

FOREIGN PATENT DOCUMENTS

| | | |
|---|---|---|
| FR | 2574357 A1 | 6/1986 |
| JP | S61139548 A | 6/1986 |
| KR | 20110125109 A | 11/2011 |

OTHER PUBLICATIONS

International Search Report and Written Opinion for International Application No. PCT/EP2016/078115, dated Feb. 20, 2017, 8 pages.
German Search Report for German Application No. 10 2015 223 047.3, dated Nov. 2, 2016, including partial English translation, 9 pages.

* cited by examiner

BRAKE DEVICE FOR A HYDRAULIC MOTOR VEHICLE BRAKE SYSTEM

CROSS REFERENCE TO RELATED APPLICATIONS

This application is the U.S. National Phase Application of PCT International Application No. PCT/EP2016/078115, filed Nov. 18, 2016, which claims priority to German Patent Application No. 10 2015 223 047.3, filed Nov. 23, 2015, the contents of such applications being incorporated by reference herein.

FIELD OF THE INVENTION

The invention relates to a brake device for a hydraulic motor vehicle brake system having a hydraulic booster stage.

BACKGROUND OF THE INVENTION

With ever-increasing demands on automated, computer-controlled driving and braking, and at the same time an ever-decreasing available structural space, negative-pressure brake force boosters, which are of large construction, reach their technical limits. It is therefore known to use brake devices with electromechanically driven hydraulic booster stages.

Such booster stages must ensure reliable functioning both in an externally actuated or fully autonomous, driver-independent actuation mode and in a manual, driver-initiated actuation mode, and also on a fall-back level in the event of malfunctions of the booster stage or a failed energy supply.

At the same time, there is the desire to optionally use the hydraulic booster stage instead of a negative-pressure brake force booster utilizing the same mechanical interfaces, and to obtain haptic feedback or pedal feel similar to that obtained with the negative-pressure brake force booster.

Known generic brake devices are normally of complex construction with electrically switchable valve devices for implementing different actuation modes. To ensure that the brake pedal is driven along in an autonomous actuation situation, it is likewise the case in known brake devices that cumbersome technical solutions are necessary.

Known brake devices with hydraulic booster stages which use heavy and expensive high-pressure accumulators as a pressure source are considered to have particular potential for improvement owing to the increased weight, structural space expenditure and switching effort.

SUMMARY OF THE INVENTION

An aspect of the invention is an improved brake device with a hydraulically acting booster stage which involves reduced switching effort for the implementation of externally-actuated and manual actuation modes in as cost-efficient a manner as possible. Here, it is the intention for comfort and assembly interfaces as similar as possible to those realized with a conventional negative-pressure brake force booster to be maintained.

The hydraulic booster stage of the brake device according to an aspect of the invention is designed as a circulation booster without high-pressure accumulators, and has two separate pistons which are functionally separate and of which in each case one piston—the pressure space piston—acts primarily during the generation of boost force in an autonomous actuation mode and the other piston—the intermediate space piston—acts primarily in a manual actuation mode. The operative switching between the pistons may in this case be performed in a particularly simple manner in a positively pressure-controlled manner and at the same time mechanically by means of a suitable arrangement of hydraulic passages in a piston rod which is displaceable relative to the pistons and/or in one of the pistons. Separate electrical or electromagnetic valve switching devices with the required dedicated control system can be omitted.

Through the use of two pistons, in particular in conjunction with the use of a pressure sensor for measuring the pressure in the booster stage, the brake device can be externally actuated in a reliable manner. The functional separation into a pressure space piston and intermediate space piston furthermore makes it possible for the pedal to be more easily driven along in the autonomous actuation situation, by virtue of a positive coupling being provided between the piston rod and the pressure space piston assigned to the autonomous actuation mode.

This coupling may preferably be realized by means of a simple ring-shaped, metallic abutment element which is fastened to the piston rod.

The brake device according to an aspect of the invention is distinguished by its particularly simple and robust design. It can furthermore be constructed in modular fashion, combined with different master brake cylinders, motor-pump units and downstream modulator units, and used on existing fastening interfaces in the vehicle, even as a replacement for negative-pressure brake force boosters. In this way, a wide variety of customer-specific characteristics can be replicated with variations of the brake device according to an aspect of the invention, and the integration thereof into existing systems can be simplified.

BRIEF DESCRIPTION OF THE DRAWINGS

Further features and advantages of aspect of the invention will emerge from the following description of multiple exemplary embodiments according to an aspect of the invention, and from the drawings. Components and features of different embodiments but with the same functions are denoted here preferentially by the same reference designations. In the drawings.

DETAILED DESCRIPTION OF THE PREFERRED EMBODIMENTS

Figure 1:
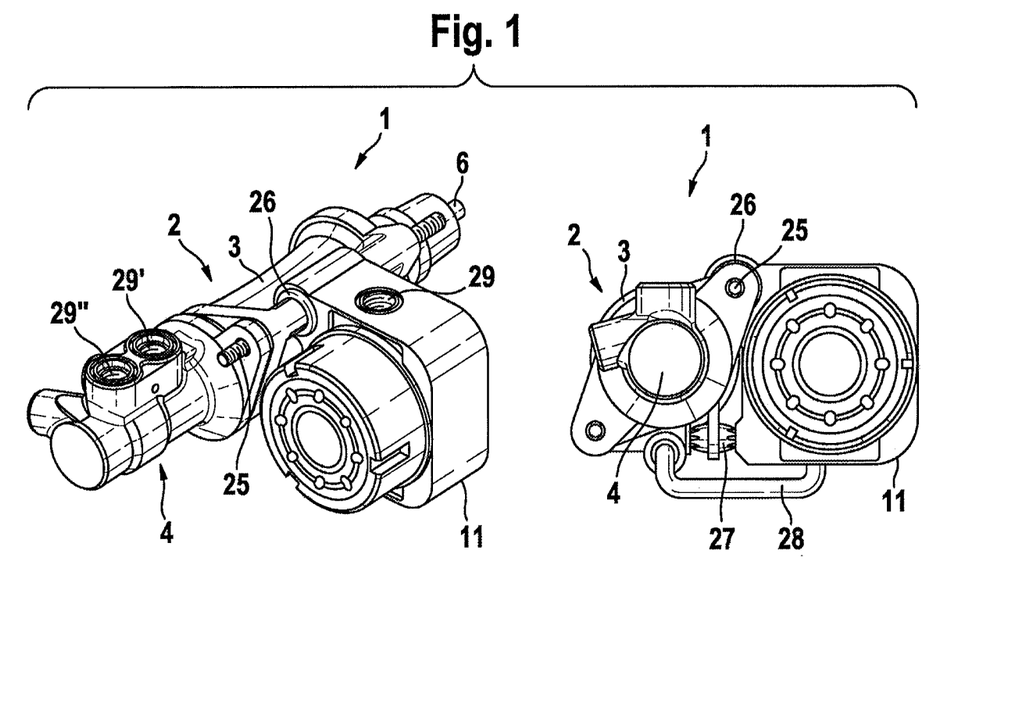
FIG. 1 shows an embodiment according to an aspect of the invention of the brake device in two external views.

FIG. 1:

An embodiment of the brake device 1 according to an aspect of the invention is illustrated in FIG. 1 in external views (three-dimensional and front view). The brake device 1 is of modular construction and comprises substantially a hydraulic booster stage 2 with a booster housing 3, a master brake cylinder 4, and an electrically driven motor-pump unit 11.

The booster stage 2 is actuated, via an axially displaceable piston rod 6, by a brake pedal 7 (not shown here), possibly with the interposition of further conventional mechanical components (not shown here).

The electromotively driven motor-pump unit 11 is mounted pivotably at the fastening bolt 25 in an elastic radial damper 26, and is supported and fixed against a fastening point on the booster housing 3 with the interposition of an axial damper 27. In this way, torques of the motor-pump unit 11 are, in terms of vibrations, optimally accommodated and isolated.

In the embodiment shown, the fastening bolt 25 has, on both ends, a thread for the mounting of a threaded nut, and serves at the same time for the mounting of the master brake cylinder 4 on the booster housing 3 and for the fastening of the entire brake device 1 to a vehicle part (not shown) which is fixed with respect to a bodyshell, such as for example a bulkhead in the engine bay.

Here, the interface is preferably designed to be unified with further types of brake devices—for example with a pneumatic brake force booster, whereby the use of different brake device types on the same vehicle type can be realized.

By means of the reservoir ports 29, 29', 29", the master brake cylinder 4 and the motor-pump unit 11 are fed from preferably a single, common pressure medium reservoir 16 (not illustrated in the figure). The use of multiple separate pressure medium reservoirs is however admissible at all times within an aspect of the invention.

Via a hydraulic connection 28, the pressure medium is, when required in a braking situation, supplied by the motor-pump unit 11 directly, without an interposed high-pressure accumulator, to the booster stage 2, where said pressure medium can be used immediately, "on demand", for building up a boosting force that acts on the master brake cylinder 4. The booster stage according to an aspect of the invention thus functions in accordance with a circulation principle, or as a circulation booster.

Figure 2:
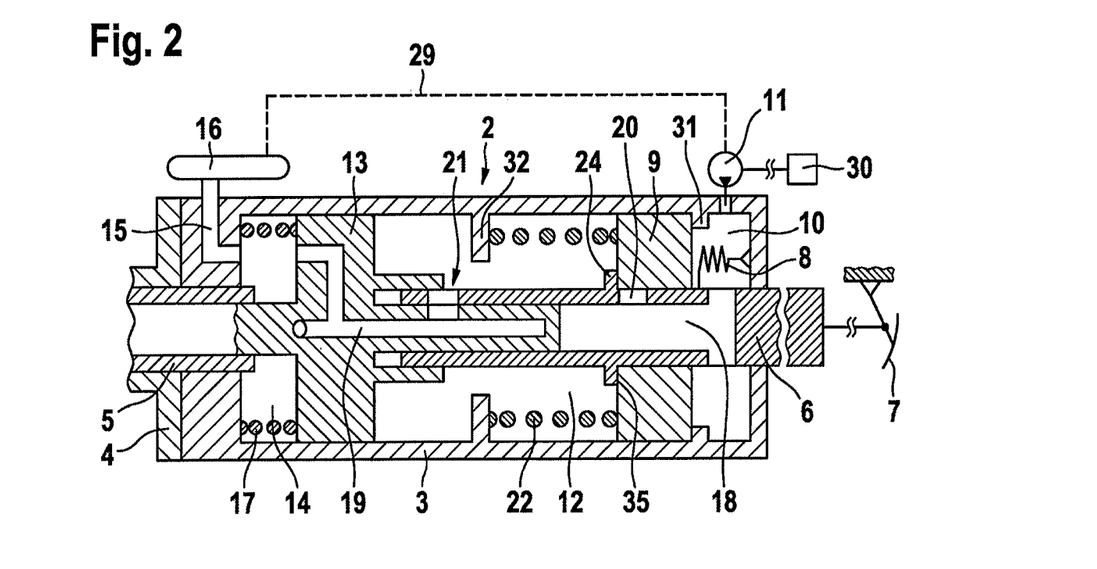
FIG. 2 is a simplified illustration of a first embodiment according to an aspect of the invention in axial section.

FIG. 2:

FIG. 2 illustrates the booster stage 2 of a first embodiment of the brake device 1 in highly simplified form in axial section. In the booster housing 3, at its end opposite the master brake cylinder 4, there is arranged a pressure space 10. The pressure space 10 is delimited by a pressure space piston 9 which is received in axially displaceable fashion in the booster housing 3.

The pressure space piston 9 is arranged axially between two abutments 31, 32 which are fixed with respect to the booster housing. In its non-actuated initial position, the pressure space piston 9 bears against the first, pressure-space-side abutment 31; here, an intermediate spring 22 is braced between the pressure space piston 9 and the second, master-cylinder-side abutment 32.

The piston rod 6 which is actuatable by means of and coupled to the brake pedal 7 extends centrally through the pressure space piston 9 and is displaceable axially relative thereto. The axial displacement of the pressure space piston 9 relative to the piston rod 6 in the direction of the master brake cylinder 4 is delimited by an abutment element 24 on the piston rod.

In the autonomous actuation mode, the pressure space 10 is supplied with hydraulic pressure medium, such that positive pressure is generated in said pressure space, by means of a motor-pump unit 11 which is controlled by means of an electronic control unit 30. A propagation of the positive pressure to an intermediate space 12 which is separated from the pressure space 10 by the pressure space piston 9 is prevented by means of an axial sealing element 35. Here, within an aspect of the invention, the sealing element 35 may be attached both to the pressure space piston 9 and to the abutment element 24.

The pressure difference between the two sides of the pressure space piston 9 sets the latter in motion. By means of the abutment element 24, the piston rod 6 is carried along (with the brake pedal 7 being driven along) and transmits the boost force, that has arisen owing to the positive pressure in the pressure space 10, to the intermediate space piston 13, which in turn transmits said boost force to the brake cylinder piston 5 in the master brake cylinder 4. The resulting displacement of the brake cylinder piston 5 causes brake pressure to be generated in the master brake cylinder 4.

A first hydraulic passage 18 is arranged in the piston rod 6. This substantially constitutes a duct or bore within the piston rod 6, which opens out with axially spaced-apart openings at the radial surface of the piston rod 6.

If, during the further braking operation or in general, the brake pedal 7 is actuated by the driver (manual or passive actuation mode), the piston rod 6 is displaced relative to the pressure space piston 9 in the direction of the master brake cylinder 4, such that the opening of the first hydraulic passage 18 at the intermediate space side—the first control opening 20—opens.

This leads to a flow of the hydraulic pressure medium from the pressure space 10 into the intermediate space 12, and ultimately a pressure equalization between the two spaces. The further boost force is now generated by the intermediate space piston 13.

The intermediate spring 22 is required if, in the active actuation situation, the driver intervenes and wishes to influence the braking operation. In this situation, the driver, by displacing the piston rod 6, overrides the actively or autonomously effected position of the pressure piston 9, and opens the first control opening 20, whereby a pressure equalization occurs and the pressure piston 9 is restored into its rear, non-actuated initial position.

In an embodiment according to an aspect of the invention which is not shown, the intermediate spring 22 can be omitted, whereby the booster housing 3 can be of axially shorter construction. The restoring movement of the pressure space piston 9 is realized in this case by means of the abutment element 24 on the piston rod 6 after the end of the braking process. Boosting of the brake force by means of the driver demand is nevertheless always achieved by means of the intermediate space piston 13 and, in the autonomous actuation mode, by means of the pressure space piston 9.

The sensor device 8 registers the change in position of the piston rod 6 in particular in the event of pedal actuation. The information obtained is used for the electronic control of the motor-pump unit 11, for example in order to initiate a start-up in the event of actuation of the brake pedal 7 or a stoppage in the event of a backward movement of the piston rod 6 after a braking process.

In the embodiment shown, a second hydraulic passage 19 is arranged in the intermediate space piston 13. This permits a hydraulic connection between the intermediate space 12 and a substantially permanently unpressurized return chamber 14, which in turn is connected via the return connection 15 to the unpressurized pressure medium reservoir 16. A second control opening 21 assigned to the second hydraulic passage 19 can be opened or closed by means of an axial relative displacement between the piston rod 6 and the intermediate space piston 13. During a normal braking operation, the second control opening 21 is fully closed (full braking) or partially closed (partial braking), such that no pressure medium flow or only a small defined pressure medium flow can escape from the intermediate space 12 into the return chamber 14, by means of the displacement of the piston rod 6 alone or together with the pressure space piston 9.

At the master brake cylinder side, in the booster housing 3, a restoring spring 17 is installed so as to be braced against the intermediate space piston 13, which restoring spring is positively prestressed during a braking process as a result of the displacement of the intermediate space piston 13.

After the braking process, the motor-pump unit 11 is stopped, the piston rod 6 and the pressure space piston 9 are reset such that the control opening 21 is fully opened, and the pressure medium passes out of the intermediate space 12 through the hydraulic passage 19 into the return chamber 14, and from there through the return connection 15 into the pressure medium reservoir 16, from which said pressure medium is, as required, supplied to the motor-pump unit 11 again via the reservoir port 29.

At the same time, the restoring spring 17 moves the intermediate space piston 13 into its non-actuated initial position in abutment with the abutment element 32 provided in particular for supporting the intermediate spring 22, or with a separate additional abutment element which is not illustrated here. A rear abutment for the intermediate space piston 13 is necessary because, otherwise, the restoring spring 17 would be unconstrained in the return chamber 14, and would move in an undefined manner.

Figure 3:
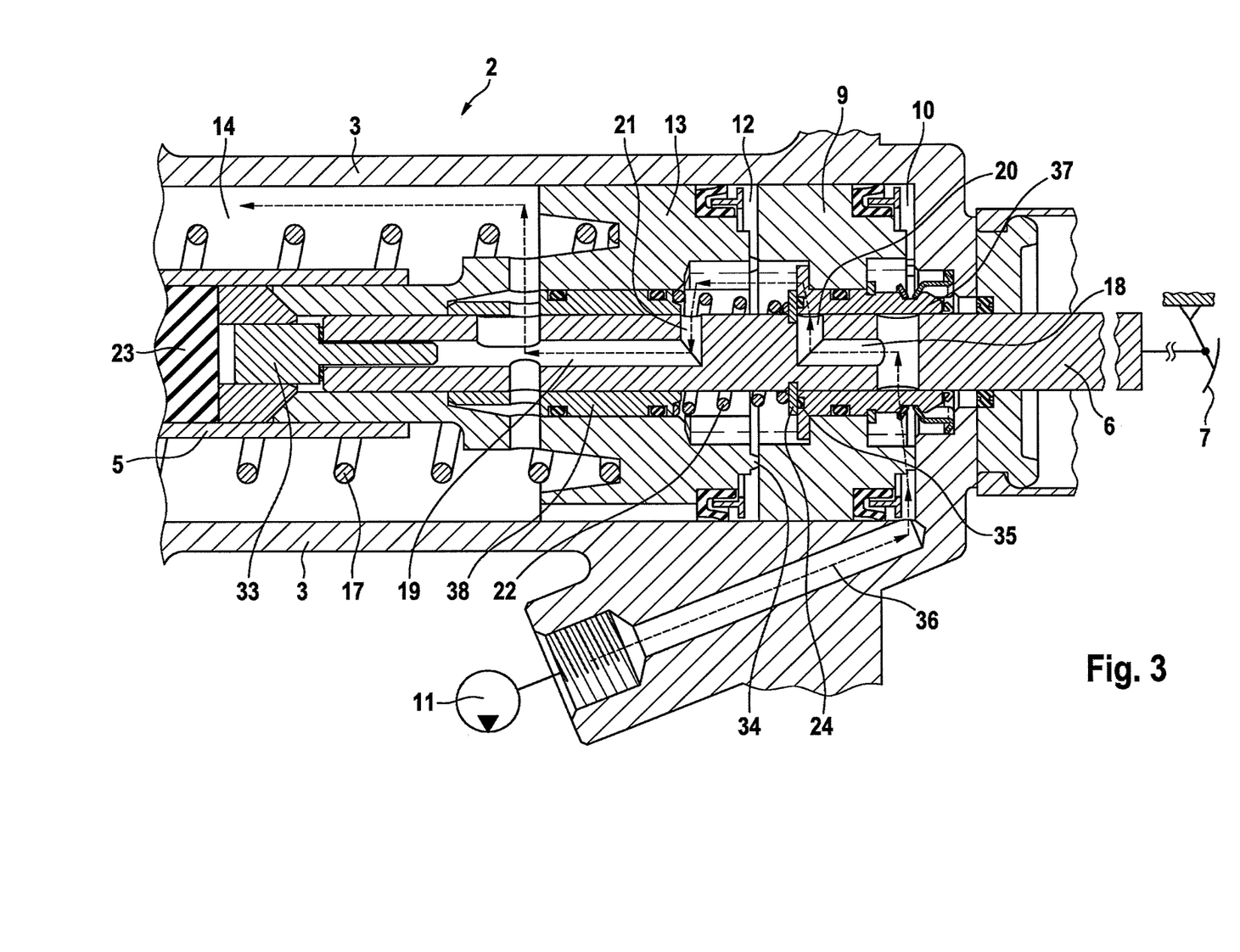
FIG. 3 shows a second embodiment according to an aspect of the invention in an axial section in a released position or non-actuated initial position.

FIG. 3:

FIGS. 3-6 show another embodiment according to an aspect of the invention of the brake device 1 in different operation or actuation modes.

FIG. 3 shows the non-actuated initial position. By contrast to the embodiment as per FIG. 2, the piston rod 6 is received in an axial passage bore in the intermediate space piston 13, such that said piston rod can extend all the way through said intermediate space piston—for example in a full braking situation or in a braking situation on the fall-back level.

Furthermore, the intermediate space piston 13 is arranged so as to be braced axially between the restoring spring 17 and the intermediate spring (22). The restoring spring 17 is supported on an abutment (not shown) which is fixed with respect to the booster housing, and said restoring spring acts on the intermediate space piston 13 axially in the direction of the pressure space piston 9, whereas the intermediate spring 22 is supported an abutment element 24 which is fixed with respect to the piston rod, and said intermediate spring acts on the intermediate space piston 13 axially in the direction of the master brake cylinder 4.

In the non-actuated initial position shown, the intermediate space piston 13 is supported directly against the pressure space piston 9. To prevent fully areal abutment of the two pistons against one another and to ensure reliable wetting of the end surfaces thereof with pressure medium, circumferentially distributed spacing projections 34 are provided.

The two hydraulic passages 18 and 19 are arranged axially spaced apart from one another in the piston rod 6. The abutment element 24 makes it possible not only for the intermediate spring 22 to be supported but also for the piston rod to be driven along by the pressure space piston 9 in the autonomous actuation mode. At the same time, an axial seal 35 is arranged between the abutment element 24 and the pressure space piston 9, which axial seal prevents the flow through the first control opening 20 and thus prevents a volume transfer between the pressure space 10 and the intermediate space 12.

The polyline 36 basically illustrates, in principle, the pressure medium circuit through the booster stage 2. The special features that apply specifically to different actuation modes will be discussed in FIGS. 4 to 6.

From the motor-pump unit 11, the pressure medium passes through a duct in the booster housing 3 into the pressure space 10. From there, the pressure medium passes through the first hydraulic passage 18 and the first control opening 20 into the intermediate space 12.

From the intermediate space 12, the pressure medium flows through the second control opening 21 and the second hydraulic passage 19 into the return chamber 14, from which said pressure medium is supplied via return connection 15 (not shown), equivalently to FIG. 2, into the pressure medium reservoir 16 and from there back to the motor-pump unit 11.

An elastic reaction element 23 is interposed between the piston rod 6 and the intermediate space piston 13, on the one hand, and the brake cylinder piston 5, on the other hand. By means of the piston rod 6, the un-boosted actuation force from the brake pedal 7 and the boost force from the intermediate space piston 13 are introduced into the reaction element 23, and from there, with the formation of hysteresis, into the brake cylinder piston 5. At the same time, the reaction element 23 introduces a reaction force into the piston rod 6, which reaction force is registered by the driver substantially as haptic feedback or as a characteristic pedal feel at the brake pedal 7.

A pressure-stable transmission piece 33 is inserted into the reaction-element-side end of the piston rod 6. The transmission piece 33 defines, by means of its contact area with the reaction element 23, the effective area for the transmission of forces between the piston rod 6 and reaction element 23, and thus also the reaction force that is perceived as haptic feedback at the brake pedal 7. The axial spacing between the transmission piece 33 and the reaction element 23 substantially influences the perceptible idle travel at the brake pedal 7. Through variations of diameters and lengths of the transmission piece 33, it is thus possible for the response behavior of the brake device 1 to be controlled by structural means.

In the preferred embodiment shown here, for particularly easy customer-specific adaptation of the response behavior, and for an exact switching capability of the booster stage 2, separate first and second control sleeves 37, 38 are provided. The control sleeves 37, 38 engage in each case radially around the piston rod 6, such that the first control opening 20 acts between the piston rod 6 and the first control sleeve 37, and the second control opening 21 correspondingly acts between the piston rod 6 and the second control sleeve 38. In association with this, the switching points can be adapted in a particularly exact, customer-specific manner, with minimized production effort, to different brake devices. In this way, it is for example possible to use a defined pairing of piston rod 6 with control sleeves 37, 38 in combination with different pressure space pistons 9 and intermediate space pistons 13, and to thus inexpensively obtain a defined response and switching behavior in the case of different customer-specific applications of the brake device 1.

The control sleeves 37, 38 are preferably manufactured from a wear-resistant and dimensionally stable material such as metal. In this way, it is made possible for the much larger pressure space piston 9 and intermediate space piston 13 to be produced, in a weight-optimized, cost-optimized and production-optimized manner, from a lightweight and easily moldable material such as for example plastic. Owing to the smaller moving masses, the dynamics of the brake device 1 are also improved.

Figure 4:
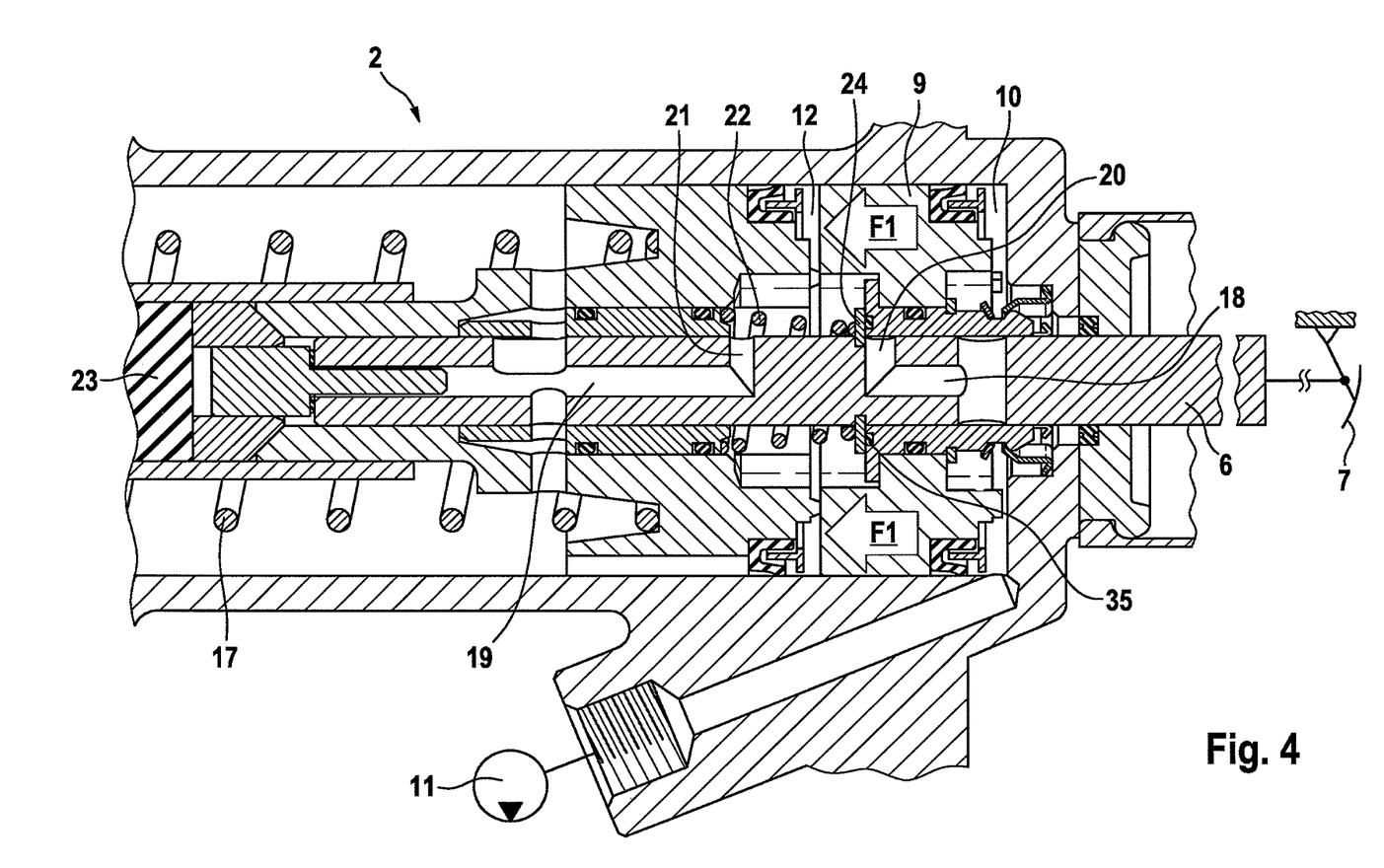
FIG. 4 shows the embodiment as per FIG. 3 in an active or autonomous actuation mode.

FIG. 4:

FIG. 4 shows the booster stage 2 in an active or autonomous actuation mode. Here, the piston rod 6 remains non-actuated. The motor-pump unit 11 pumps the pressure medium at high pressure into the pressure space 10 in an electronically controlled manner. The pressure space piston 9 is against the abutment element The axial seal 35 prevents the outflow of the pressure medium into the intermediate space 12, such that, in the pressure space 10, a high hydraulic pressure is built up which acts on the end surface of the pressure space piston 9. The resulting boost force F1 is mechanically transmitted from the pressure space piston 9 to the intermediate space piston 13, and onward to the brake cylinder piston 5. Here, the pressure space piston 9 moves together with the intermediate space piston 13 in the direction of the master brake cylinder 4, and the piston rod 6 is carried along by the pressure space piston 9 by means of the abutment element 24.

Figure 5:
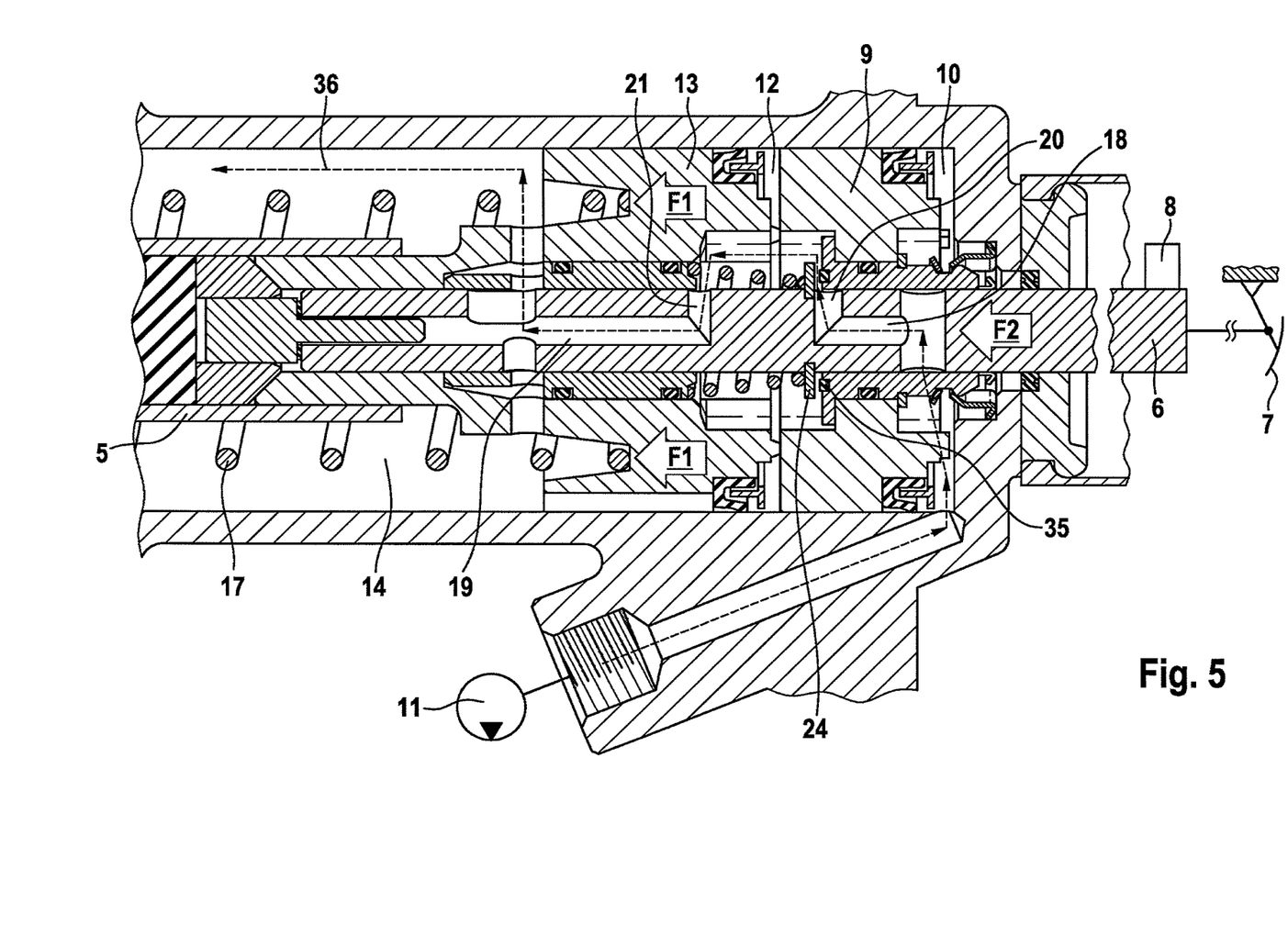
FIG. 5 shows the embodiment as per FIG. 3 in a passive or manual actuation mode during partial braking.

FIG. 5:

FIG. 5 shows the booster stage 2 in a passive or manual actuation mode during a driver-initiated moderate partial braking operation.

The driver actuates the piston rod 6 by means of the brake pedal 7. A sensor device 8 registers the braking demand, which is converted by means of an electronic control unit (not shown) into a control command to the motor-pump unit 11 to deliver the pressure medium at high pressure into the pressure space 10. The foot-imparted force of the driver F2 causes the piston rod 6 to be displaced relative to the pressure space piston 9, such that the first control opening 20 is opened and a pressure equalization occurs between the pressure space 10 and the intermediate space 12. The hydraulic pressure now acts directly on the end surface of the intermediate space piston 13, such that the latter is displaced with the boost force F1 in the direction of the brake cylinder piston 5 and transmits the boost force F1 to the latter.

Here, the second control opening 21 is however not fully closed; it is rather the case that the flow through said second control opening is merely reduced in a defined manner. A fraction of the pressure medium that is thus controllable by means of the movement of the piston rod 6 escapes continuously from the intermediate space 12 into the return chamber 14 and follows the pressure medium circuit 36 described above. Force equilibrium between the intermediate space piston 13 and the brake cylinder piston 5 thus be set easily and without dedicated, special closed-loop control. Furthermore, in this way, a particularly comfortable response behavior of the brake device 1 similar to that of a negative-pressure brake force booster is achieved, and the control of the motor-pump unit 11 can be considerably simplified with regard to the closed-loop control of the delivery flow rate.

Figure 6:
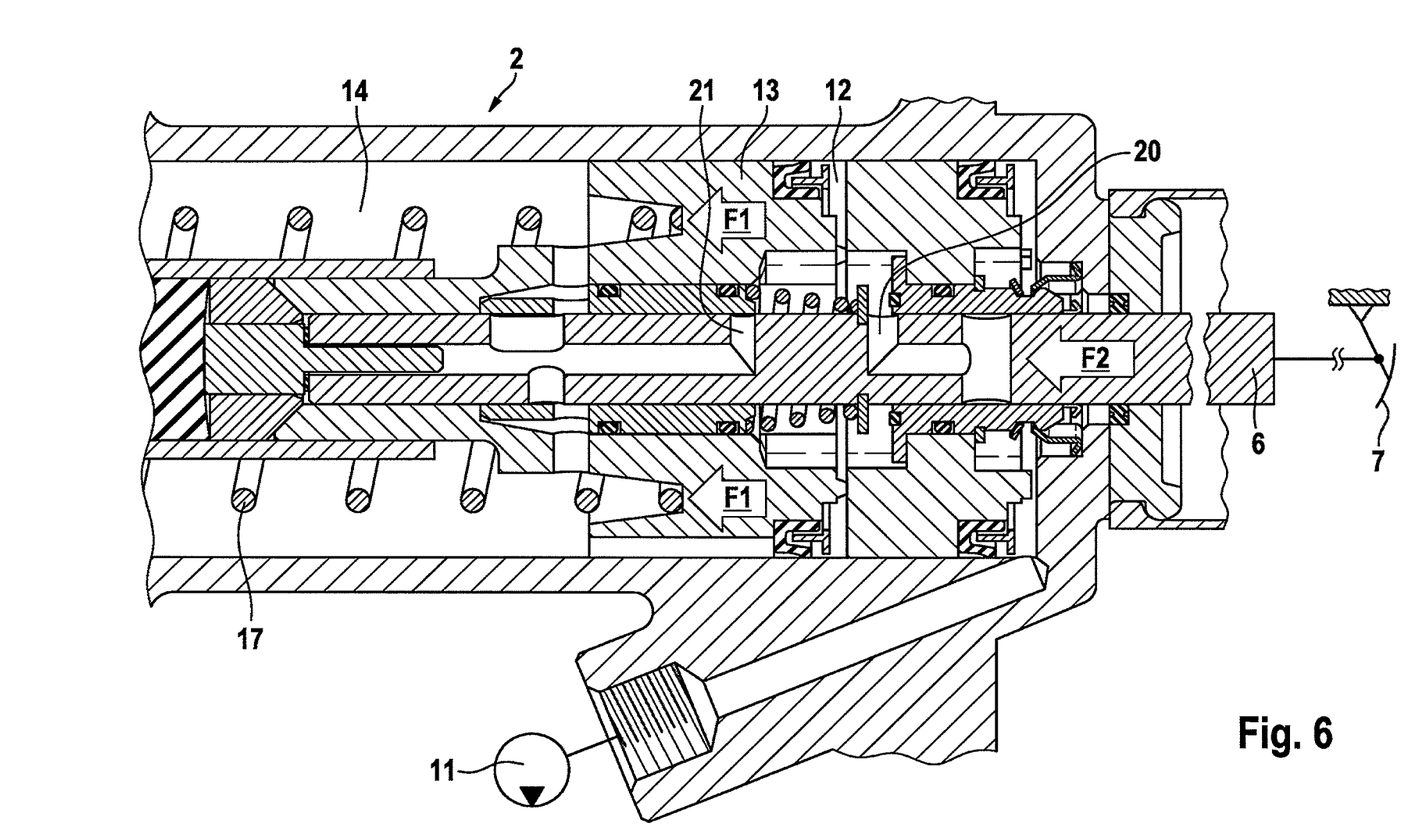
FIG. 6 shows the embodiment as per FIG. 3 in a passive or manual actuation mode during intensive full braking.

FIG. 6:

The figure illustrates the booster stage 2 likewise in a passive or manual actuation mode, but in a full braking situation. By contrast to the situation described above in FIG. 5, the driver actuates the brake pedal 7 and the piston rod 6 with a much greater foot-imparted force F2.

In this way, the first control opening 20 is fully opened, and the second control opening 21 is fully closed. The hydraulic connection from the intermediate space 12 into the return chamber 14 is now fully shut off, and the hydraulic pressure in the intermediate space 12 can reach its technical maximum value and act directly on the intermediate space piston 13. In this way, the greatest possible boost force F1 can be generated, which is furthermore additionally assisted by the added foot-imparted force F2.

During a passive actuation mode as per FIGS. 5 and 6, the pressure space piston 9 remains uninvolved in the generation of the boost force F1, and remains substantially unmoved in its non-actuated initial position.

LIST OF REFERENCE SIGNS

1 Brake device
2 Booster stage
3 Booster housing
4 Master brake cylinder
5 Brake cylinder piston
6 Piston rod
7 Brake pedal
8 Sensor device
9 Pressure space piston
10 Pressure space
11 Motor-pump unit
12 Intermediate space
13 Intermediate space piston
14 Return chamber
15 Return connection
16 Pressure medium reservoir
17 Restoring spring
18 Hydraulic passage
19 Hydraulic passage
20 Control opening
21 Control opening
22 Intermediate spring
23 Reaction element
24 Abutment element
25 Fastening bolt
26 Radial damper
27 Axial damper
28 Hydraulic connection
29 Reservoir port
30 Electronic control unit
31 Abutment
32 Abutment
33 Transmission piece
34 Spacing projection
35 Axial seal
36 Pressure medium circuit
37 Control sleeve
38 Control sleeve

The invention claimed is:

1. A brake device for a hydraulic motor vehicle brake system, comprising:
   a hydraulic booster stage and
   a master brake cylinder with an axially displaceable brake cylinder piston,
   wherein the brake device, within normal boosting operation, is configured to operate both in an autonomous, driver-independent actuation mode in an electronically controlled manner and in a manual actuation mode in a manner controlled by the driver, and outside the normal boosting operation, is configured to operate in an emergency mode with an actuation force generated by the driver alone, wherein within the normal boosting operation, the autonomous, driver-independent actuation mode is assigned a first booster piston in a booster housing of the booster stage and the manual actuation mode is assigned a second booster piston separate from the first booster piston in the booster housing of the booster stage, each of the first and second booster pistons configured to be acted on directly by a boost force and transmit the boost force mechanically to components connected operatively downstream.

2. The brake device as claimed in claim 1, wherein a piston rod is received in axially displaceable fashion in the booster stage, wherein the piston rod is configured to transmit the actuation force from a brake pedal to the brake cylinder piston, and a sensor device is provided for directly or indirectly monitoring the axial position of the piston rod.

3. The brake device as claimed in claim 2, wherein in the booster housing, there are formed a pressure space, which is fed with pressure medium directly from an electromotive motor-pump unit, an intermediate space, which is fed with pressure medium from the pressure space, and a substantially unpressurized return chamber, which is fed with the pressure medium from the intermediate space and which is connected via a return connection to an unpressurized pressure medium reservoir, wherein the first and second booster pistons comprise an axially displaceable pressure space piston that separates the pressure space from the intermediate space, and an axially displaceable intermediate space piston that separates the intermediate space from the return chamber.

4. The brake device as claimed in claim 3, wherein the intermediate space piston acts with the boost force on the brake cylinder piston if hydraulic pressure medium is fed with a boost pressure from the motor-pump unit into the pressure space.

5. The brake device as claimed in claim 3, wherein in the autonomous, driver-independent actuation mode, a mechanical transmission of the boost force from the pressure space piston to the intermediate space piston is realized, and in the manual actuation mode, a hydraulic transmission of the boost force from the intermediate space to the intermediate space piston is realized.

6. The brake device as claimed in claim 3, wherein the piston rod is arranged axially at least in sections in the pressure space piston and in the intermediate space piston.

7. The brake device as claimed in claim 3, wherein in the piston rod, there is provided at least one first hydraulic passage which extends in regions axially through the piston rod and which opens with at least two axially spaced-apart openings into the radial surface of the piston rod.

8. The brake device as claimed in claim 3, wherein in the piston rod, there are arranged a first hydraulic passage and a second hydraulic passage which, axially spaced apart from one another, extend in regions axially through the piston rod and open with at least two axially spaced-apart openings into the radial surface of the piston rod.

9. The brake device as claimed in claim 7, wherein one of the at least two axially spaced-apart openings of the first hydraulic passage at the intermediate space side is provided as a first control opening for the control of a hydraulic connection between the pressure space and the intermediate space through the first hydraulic passage.

10. The brake device as claimed in claim 8, wherein one of the at least two axially spaced-apart openings of the second hydraulic passage at the intermediate space side is provided as a second control opening for the control of a hydraulic connection between the intermediate space and the return chamber through the second hydraulic passage.

11. The brake device as claimed in claim 3, wherein the intermediate space piston is arranged so as to be braced axially between two spring elements.

12. The brake device as claimed in claim 11, wherein the intermediate space piston, in its non-actuated initial position, is pressed by a restoring spring, which is positively prestressed during a braking process, against the pressure space piston or against an abutment fixed with respect to the booster housing.

13. The brake device as claimed in claim 2, wherein an elastic reaction element is operatively interposed between the brake cylinder piston and the piston rod, which reaction element is compressed during the manual actuation and, with the formation of hysteresis, introduces a reaction force as haptic feedback through the piston rod into the brake pedal.

14. The brake device as claimed in claim 3, wherein the piston rod is arranged axially at least in sections in the pressure space piston and in the intermediate space piston.

15. The brake device as claimed in claim 8, wherein one of the at least two axially spaced-apart openings of the first hydraulic passage at the intermediate space side is provided as a first control opening for the control of a hydraulic connection between the pressure space and the intermediate space through the first hydraulic passage.

16. The brake device as claimed in claim 3, wherein on the piston rod, there is arranged an abutment element which limits an axial displacement of the pressure space piston relative to the piston rod in the direction of the intermediate space.

\* \* \* \* \*